US011100115B1

(12) United States Patent
Jonkers et al.

(10) Patent No.: US 11,100,115 B1
(45) Date of Patent: Aug. 24, 2021

(54) INFRASTRUCTURE AND METHOD FOR GENERATING SEARCH RESULTS

(71) Applicants: Matheus W. Jonkers, San Diego, CA (US); Hieu Van Nguyen, San Diego, CA (US); Ei Myat San, Boston, MA (US); Richard Matthew Atnip, Fullerton, CA (US)

(72) Inventors: Matheus W. Jonkers, San Diego, CA (US); Hieu Van Nguyen, San Diego, CA (US); Ei Myat San, Boston, MA (US); Richard Matthew Atnip, Fullerton, CA (US)

(73) Assignee: Intuit Inc., Mountain View, CA (US)

( * ) Notice: Subject to any disclaimer, the term of this patent is extended or adjusted under 35 U.S.C. 154(b) by 787 days.

(21) Appl. No.: 15/905,481

(22) Filed: Feb. 26, 2018

(51) Int. Cl.
*G06F 16/25* (2019.01)
*G06Q 40/00* (2012.01)
*G06F 16/2457* (2019.01)
*G06F 16/9535* (2019.01)
*G06F 40/174* (2020.01)

(52) U.S. Cl.
CPC .. *G06F 16/24578* (2019.01); *G06F 16/24575* (2019.01); *G06F 16/252* (2019.01); *G06F 16/9535* (2019.01); *G06F 40/174* (2020.01); *G06Q 40/123* (2013.12)

(58) Field of Classification Search
CPC ......... G06F 16/24578; G06F 16/24575; G06F 16/9535; G06F 16/252; G06F 40/174; G06Q 40/123
See application file for complete search history.

(56) References Cited

U.S. PATENT DOCUMENTS

| 7,698,342 | B1* | 4/2010 | Evans | G06F 40/174 |
| | | | | 707/755 |
| 8,402,047 | B1* | 3/2013 | Mangini | G06F 16/2428 |
| | | | | 707/769 |
| 2006/0230033 | A1* | 10/2006 | Halevy | G06F 16/951 |
| 2007/0282616 | A1* | 12/2007 | Brunswig | G06Q 10/067 |
| | | | | 705/1.1 |
| 2008/0313225 | A1* | 12/2008 | Spicer | G06F 16/955 |
| 2009/0006940 | A1* | 1/2009 | Hardt | G06F 40/174 |
| | | | | 715/224 |
| 2014/0149399 | A1* | 5/2014 | Kurzion | G06F 16/9535 |
| | | | | 707/723 |
| 2017/0193016 | A1* | 7/2017 | Kulkarni | G06F 16/212 |
| 2019/0065455 | A1* | 2/2019 | Dua | G06F 40/174 |

* cited by examiner

*Primary Examiner* — Alicia M Willoughby
(74) *Attorney, Agent, or Firm* — Ferguson Braswell Fraser Kubasta PC

(57) ABSTRACT

A method may include obtaining forms each including fields each including field metadata, obtaining a schema including elements each including element metadata and defining constraints on a field of a form, identifying a corresponding element for each field, creating, for the field, a search result by combining the field metadata of the field and the element metadata of the corresponding element, adding the search result to a search results repository, receiving, from a user, a search query, in response to receiving the search query, determining, using the search results repository, search results, and ranking, using a ranking model, the search results.

20 Claims, 11 Drawing Sheets

Search Results Repository 430

Search Result A 432A

| Form ID:<br>Child Care Expenses<br>412A | Field ID:<br>Qualified Expenses<br>414A | Result Description:<br>expenses incurred for person listed in Line 1; prepaid expenses are treated as paid in the year the care is provided<br>434A |

⁞

Search Result N 432N

FIG. 4B

Search Query:
Where to enter credit in tax return?
450

Search Results 452

Search Result A 432A

| Form ID: Child Care Expenses 412A | Field ID: Qualified Expenses 414A | Result Description: expenses incurred. 434A |

Search Result B 432B

| Form ID: Mortgage Interest Credit 412B | Field ID: Interest Paid 414B | Result Description: interest paid... 434B |

Search Result C 432C

| Form ID: Earned Income Credit 412C | Field ID: Earned Income 414C | Result Description: wages, salaries... 434C |

Search Result D 432D

| Form ID: Electric Vehicle Credit 412D | Field ID: Expense Deduction 414D | Result Description: including depreciation... 434D |

FIG. 4C

INFRASTRUCTURE AND METHOD FOR GENERATING SEARCH RESULTS

BACKGROUND

When filling out complex forms, users need to quickly find the fields in which to enter specific types of data. For example, tax preparers need to quickly find the fields to enter specific types of tax data in a tax return consisting of multiple forms. Existing help systems may indicate the form which should contain the data, but do not indicate which field within the form should contain the data. In addition, the information in existing help systems is generated manually (e.g., based on information manually entered in a spreadsheet).

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including obtaining forms each including fields each including field metadata, obtaining a schema including elements each including element metadata and defining constraints on a field of a form, identifying a corresponding element for each field, creating, for the field, a search result by combining the field metadata of the field and the element metadata of the corresponding element, adding the search result to a search results repository, receiving, from a user, a search query, in response to receiving the search query, determining, using the search results repository, search results, and ranking, using a ranking model, the search results.

In general, in one aspect, one or more embodiments relate to a system including a computer processor, forms each including fields each including field metadata, a schema including elements each including element metadata and defining constraints on a field of a form, a search results repository including search results, and a graphical user interface (GUI) executing on the computer processor configured to receive, from a user, a search query. The system further includes a search results generator executing on the computer processor configured to identify a corresponding element for each field, create, for the field, a search result by combining the field metadata of the field and the element metadata of the corresponding element, add the search result to the search results repository, and in response to receiving the search query, determine, using the search results repository, search results. The system further includes a search results ranker including a ranking model and executing on the computer processor. The search results ranker is configured to rank, using the ranking model, the search results. The system further includes a repository including the forms, the schema, and the search results repository.

In general, in one aspect, one or more embodiments of the invention relate to a non-transitory computer readable medium including instructions that, when executed by a processor, perform obtaining forms each including fields each including field metadata, obtaining a schema including elements each including element metadata and defining constraints on a field of a form, identifying a corresponding element for each field, creating, for the field, a search result by combining the field metadata of the field and the element metadata of the corresponding element, adding the search result to a search results repository, receiving, from a user, a search query, in response to receiving the search query, determining, using the search results repository, search results, and ranking, using a ranking model, the search results.

Other aspects of the invention will be apparent from the following description and the appended claims.

BRIEF DESCRIPTION OF DRAWINGS

FIG. 4A, FIG. 4B, FIG. 4C, FIG. 4D, and FIG. 4E show examples in accordance with one or more embodiments of the invention.

DETAILED DESCRIPTION

Figure 1A:
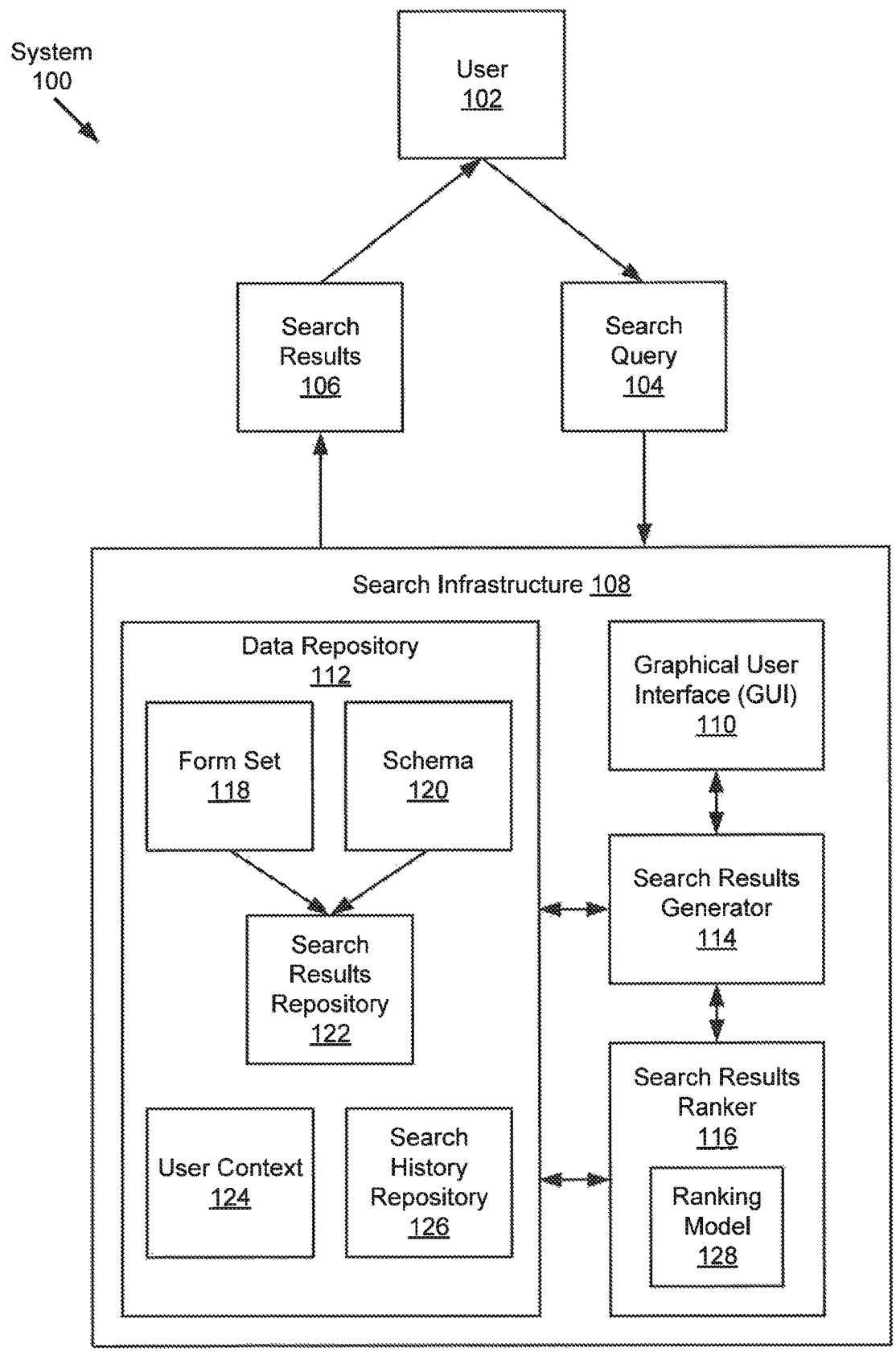
FIG. 1A, FIG. 1B, and FIG. 1C show systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to an infrastructure and method for generating search results. In one or more embodiments, the search results are based on a set of forms (e.g., a set of tax forms) and a schema that defines the structure of the forms. Each field of each form may be linked to a corresponding element of the schema. A repository of search results may be synthesized by combining metadata associated with each field of each form with metadata associated with the schema element corresponding to the field. Each search result may identify a specific field in a form. By combining the metadata, each search result may provide a comprehensive description of the corresponding field.

The search results may be used to satisfy search queries submitted by users. For example, a search query may request guidance regarding where to enter specific type of information (e.g., a credit) into the set of forms. The search results may be ranked relative to a user context. For example, a search result may be ranked higher or lower based on an income level of the user. Alternatively, a search result may be ranked higher or lower based on a search history of the user and/or comparable users.

FIG. 1A shows a system (100) in accordance with one or more embodiments of the invention. As shown in FIG. 1A, the system (100) includes a user (102), a search query (104), search results (106), and a search infrastructure (108). In one or more embodiments, the search infrastructure (108) takes the form of the computing system (500) described with respect to FIG. 5A and the accompanying description below, or takes the form of the client device (526) described with respect to FIG. 5B.

In one or more embodiments, a user (102) may be an individual, business, or other entity that issues a search query (104). The search query (104) may include one or more keywords and/or keyphrases that represent search criteria of the user (102). The one or more keywords and/or keyphrases may represent search criteria regarding where to enter data into a set of forms. For example, a search query (104) relative to a set of tax forms might include the keywords: "enter" and "credit". In one or more embodiments, search results (106) are generated in response to the search query (104). Continuing the non-limiting example above, search results (106) might include: "child care expenses form, line 1" and "mortgage interest credit form, line 2".

In one or more embodiments, the search infrastructure (108) may include a graphical user interface (GUI) (110), a data repository (112), a search results generator (114), and a search results ranker (116). In one or more embodiments, the GUI (110) includes functionality to receive a search query (104) from a user (102), and, in response, provide search results (106) to the user (102). The GUI (110) may include functionality to receive search queries (104) from, and provide search results (106) to, multiple users (102). The GUI (110) may include functionality to receive a selection of one or more search results (106) from a user (102).

In one or more embodiments, the data repository (112) may be any type of storage unit and/or device (e.g., a file system, database, collection of tables, or any other storage mechanism) for storing data. Further, the data repository (112) may include multiple different storage units and/or devices. The multiple different storage units and/or devices may or may not be of the same type or located at the same physical site.

Figure 1B:
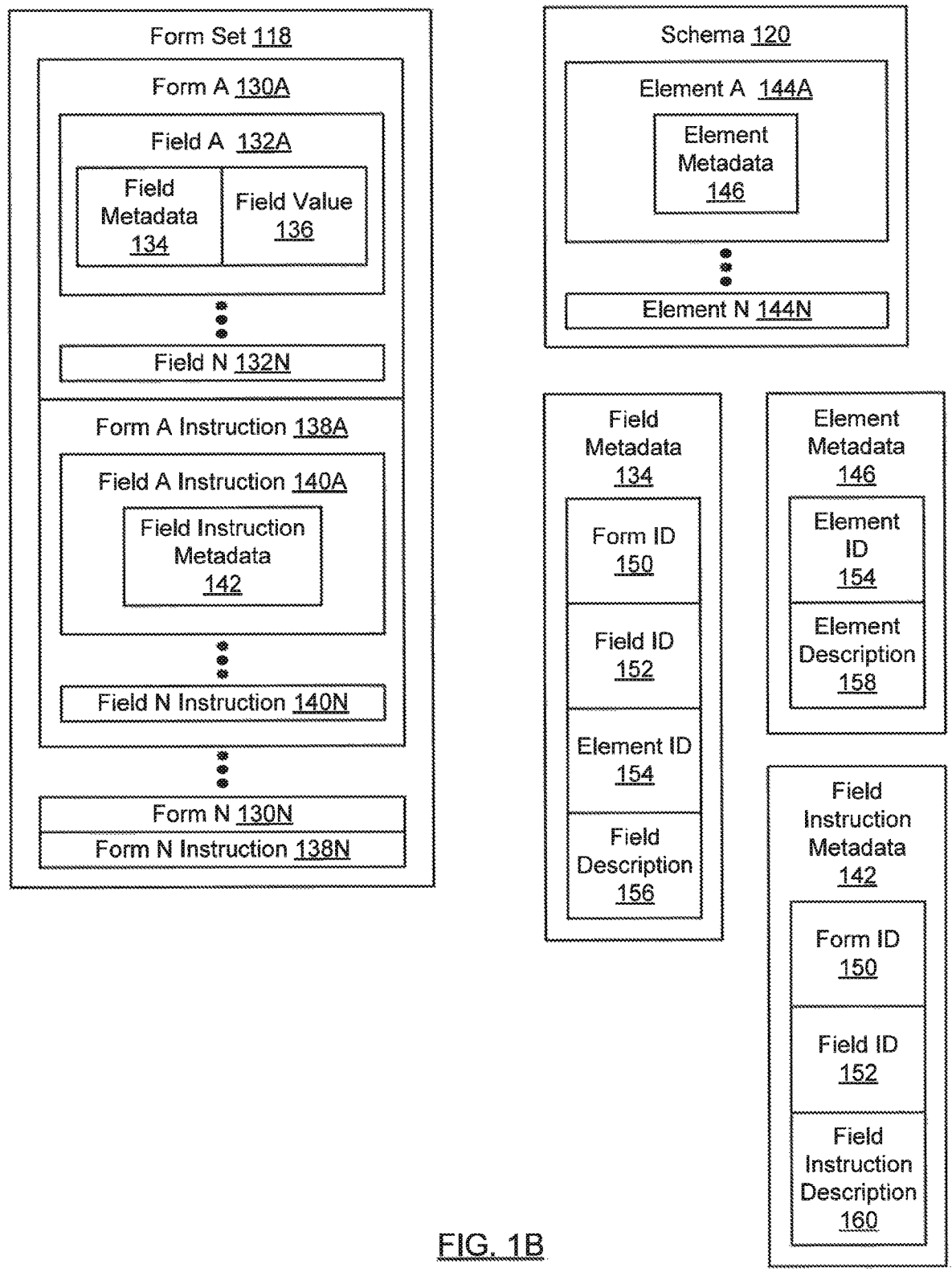

In one or more embodiments, the data repository (112) includes a form set (118), a schema (120), a search results repository (122), a user context (124), and a search history repository (126). Turning to FIG. 1B, in one or more embodiments, the form set (118) includes forms (130A, 130N). For example, the form set (118) may correspond to a tax return that includes tax forms obtained from a tax authority (e.g., where different tax returns each correspond to a different form set (118)). Each form (130A) may include fields (132A, 132N) that describe various data of the form (130A). Each field (132A) may include field metadata (134) and a field value (136).

In one or more embodiments, the field metadata (134) includes a form identifier (150), a field identifier (152), an element identifier (154), a field description (156), and any other information regarding the corresponding field (132A). In one or more embodiments, the form identifier (150) is a name (e.g., Form 1040) or other identifier of the form (130A) that includes the field (132A). In one or more embodiments, the field identifier (152) is a name, number (e.g., line number 3), or other identifier of the corresponding field (132A). The element identifier (154) may be a name, number, or other identifier of an element (144A) of the schema (120) corresponding to the field (132A), as described below. In one or more embodiments, including the element identifier (154) in the field metadata (134) establishes a linkage between a field (132A) of a form (130A) and the corresponding element (144A) of the schema (120).

The field description (156) may be any alphanumeric expression that describes the purpose and/or meaning of the corresponding field (132A). For example, the field description (156) may include a set of keywords. The field value (136) may be any numerical, string, or other type of value corresponding to the field (132A).

In one or more embodiments, the field metadata (134) may include constraints on the corresponding field value (136). For example, the field metadata (134) may specify the type (e.g., numerical type, string type, number of occurrences, etc.) of the corresponding field value (136). In one or more embodiments, the field metadata (134) may include one or more attributes of the corresponding field (132A). For example, the field metadata (134) may specify whether the field value (136) of the corresponding field (132A) is a calculated value (e.g., derived from a field value (136) of another field), or is an input value received from the user (102) via the GUI (110).

Continuing with FIG. 1B, in one or more embodiments, the schema (120) defines the structure of the forms (130A, 130N) of the form set (118). The schema (120) may include elements (144A, 144N). In one or more embodiments, an element (144A) may describe constraints and/or other information relating to a corresponding field (132A) of a form (130A). For example, the elements (144A, 144N) of the schema (120) may define constraints on the fields of data files corresponding to the forms (130A, 130N) of an electronically filed tax return.

An element (144A) may include element metadata (146). In one or more embodiments, the element metadata (146) includes an element identifier (154) and an element description (158). In one or more embodiments, the element identifier (154) is unique within the schema (120). In one or more embodiments, the element metadata (146) may include constraints on the field value (136) of the field (132A) corresponding to the element (144A). The element description (158) may be any alphanumeric expression that describes the purpose or meaning of the corresponding element (144A). For example, the element description (158) may include a set of keywords.

Continuing the non-limiting example above, the data files of an electronically filed tax return may be generated, using the schema (120), from forms (130A, 130N) edited by a user (102) via the GUI (110). The element identifier (154) of the element metadata (146) of an element (144A) may be used to identify the field (132A) corresponding to the element (144A), since the same element identifier (154) is also included in the field metadata (134) of the corresponding field (132A).

In one or more embodiments, forms (130A, 30N) have corresponding form instructions (138A, 138N). That is, a form (130A) may have a corresponding form instruction (138A) that instructs a user (102) regarding how to populate the corresponding form (130A). A form instruction (138A) may include field instructions (140A, 140N) corresponding to the fields (132A, 132N) of the form (130A). Each field instruction (140A) may instruct a user (102) regarding how to populate the corresponding field (132A). A field instruction (140A) may include field instruction metadata (142).

In one or more embodiments, the field instruction metadata (142) includes a form identifier (150), a field identifier (152), and a field instruction description (160). The field instruction description (160) may be any alphanumeric expression that provides guidance to the user (102) regarding how to populate the corresponding field (132A). For example, the field instruction description (160) may include a set of keywords.

Figure 1C:
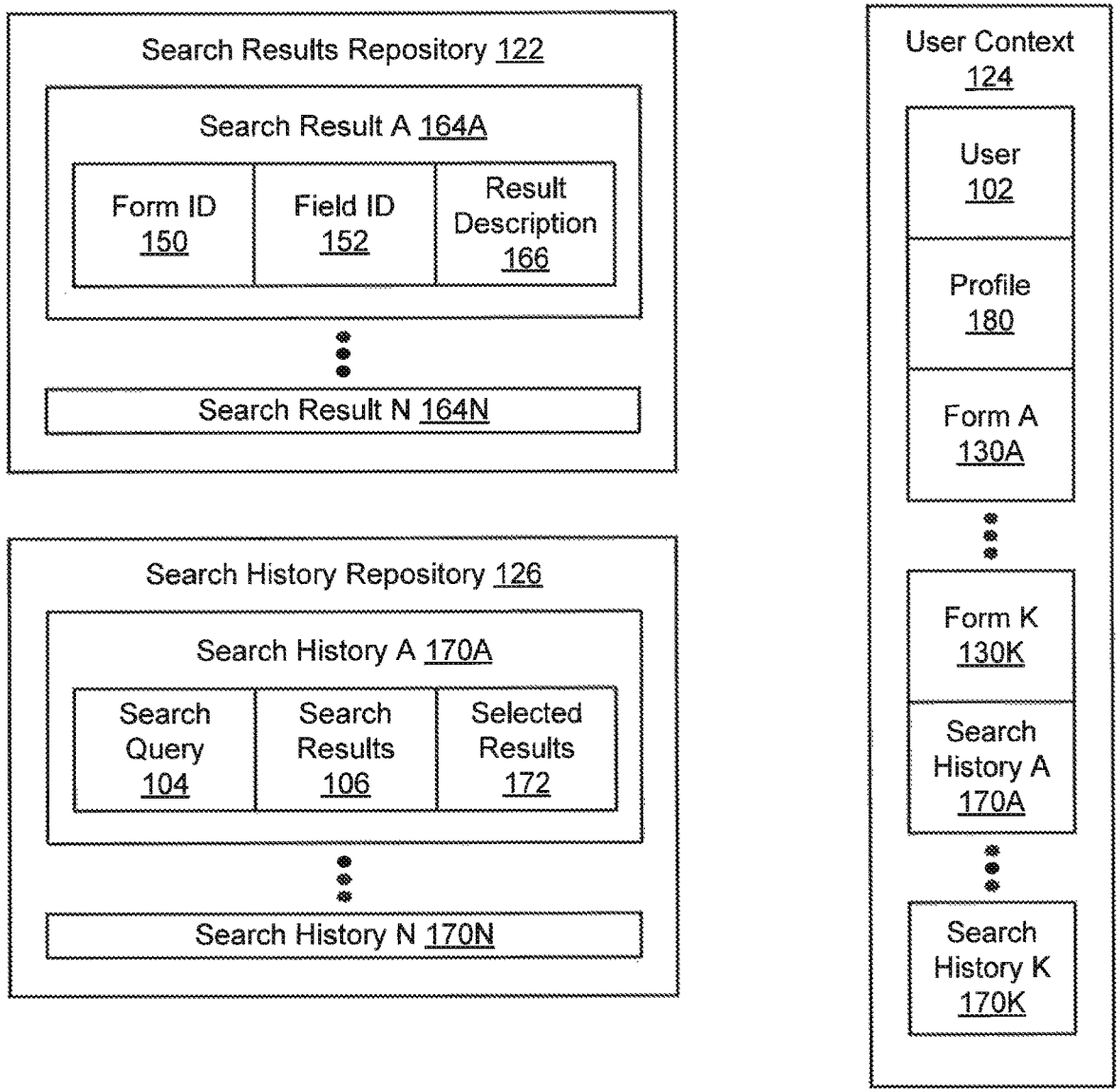

Turning to FIG. 1C, in one or more embodiments, the search results repository (122) includes search results (164A, 164N). A search result (164A) may include a form identifier (150), a field identifier (152), and a result description (166). That is, the search result (164A) identifies a field (132A) of a form (130N) and provides a description of the field (132A). In one or more embodiments, the result description (166) includes field metadata (134) of the field (132A), element metadata (146) of the element (144A) corresponding to the field (132A) and/or field instruction metadata (142) corresponding to the field (132A). For example, the result description (166) may be a combination of (e.g., a concatenation of):

1) the field description (156) of the field metadata (134) of the corresponding field (132A), 2) the element description (158) of the element metadata (146) of the element (144A) corresponding to the field (132A), and/or 3) the field instruction description (160) of the field instruction metadata (142) of the field instruction (140A) corresponding to the field (132A).

Returning to FIG. 1A, in one or more embodiments, the search results generator (114) includes functionality to generate search results (106) in response to the search query (104) of the user (102). The search results (106) generated in response to the search query (104) may be a subset of the search results (e.g., (164A, 164N) in FIG. 1C) included in the search results repository (122). In one or more embodiments, the search results generator (114) includes functionality to generate the search results repository (122) using the form set (118) and the schema (120).

In one or more embodiments, the search results ranker (116) may include a ranking model (128). The search results ranker (116) may include functionality to assign a ranking (e.g., an ordering), using the ranking model (128), to search results (106) generated in response to a search query (104). In one or more embodiments, the search results ranker (116) uses machine learning techniques (e.g., using the MLlib machine learning library from Apache Spark™ or systems with similar functionality) to generate the ranking model (128). In one or more embodiments, the search history repository (126) functions as a training dataset for the ranking model (128). In one or more embodiments, the search results ranker (116) may be implemented using Python libraries and toolkits, such as, for example, Numpy, SciPy, Pandas, and/or Scikit-learn.

In one or more embodiments, the ranking model (128) may include weighting factors used to rank (e.g., using various machine learning techniques) the relevance of various keywords used in search results (106). In one or more embodiments, the ranking model (128) includes rules that assign weighting factors to keywords. For example, a rule may assign a high weighting factor to a keyword (e.g., "mortgage") included in the search results (106) based on the inclusion of one or more other keywords (e.g., "homeowner", "property") in the corresponding search query (104). In one or more embodiments, a weighting factor may be based on a user context (124), as described below.

Returning to FIG. 1C, in one or more embodiments, the search history repository (126) includes search histories (170A, 170N). A search history (170N) may include a search query (e.g., (104) in FIG. 1A), search results (e.g., (106) in FIG. 1A), and selected results (172). The selected results (172) may be a subset of the search results (106) that a user (102) examined (e.g., based on tracking mouse clicks of the user (102) entered via the GUI (110)). In other words, the selected results (172) may correspond to "hits" indicating that the selected results (172) were of interest to a user (102). For example, the user (102) may have examined and/or entered data into a field (132A) of a form (130A) corresponding to a specific selected result (172).

In one or more embodiments, the user context (124) includes a profile (180), forms (130A, 130K), and search histories (170A, 170K) corresponding to a user (102). The profile (180) may include various information about the user (102) relevant to the ranking of the search results (106). For example, the profile (180) may include: a location of the user (102), an income level of the user (102), a family status of the user (102), etc. For example, a field (132A) (e.g., an investment credit field) specified in a search result may have greater relevance, and therefore may be ranked high, for a user (102) whose income level exceeds a predetermined amount.

In one or more embodiments, a rule associated with the ranking model (128) may assign a weighting factor to a keyword used in the search results (106) based on the field value (136) of a field (132A) of a form (130A) populated by a user (102) and included in the user context (124). For example, the field value (136) may indicate a location of the user (102), an income level of the user (102), a family status of the user (102), etc. In addition, the income level of the user (102) may be inferred based on a location of the user (102) (e.g., the location may be in a high-income or a low-income area).

In one or more embodiments, the selected results (172) of search histories (170A, 170K) included in the user context (124) may be used to rank the search results (106) relative to the previous behavior of the user (102). In one or more embodiments, a rule associated with the ranking model (128) may assign a weighting factor to a keyword based on the presence of the keyword in the selected results (172) of a search history (170A) included in the user context (124). In one or more embodiments, search histories (170A, 170K) of the user context (124) whose search query (104) is comparable to the current search query (104) may be used to rank the search results (106). In one or more embodiments, a comparable search query may include keywords that are similar to the keywords of the current search query. For example, a comparable search query may include keywords that are within a threshold degree of similarity relative to the keywords of the current search query (e.g., in the context of a semantic model of various keywords).

In one or more embodiments, the selected results (172) of search histories (170A, 170N) of the search history repository (126) associated with comparable users of the current user may be used to rank the search results (106). In one or more embodiments, comparable users have a profile (180) similar to the current user. For example, two profiles (180) may be similar when they include a similar location or income level (e.g., when the respective locations or income levels are within a threshold degree of similarity).

While FIG. 1A, FIG. 1B, and FIG. 1C show configurations of components, other configurations may be used without departing from the scope of the invention. For example, various components may be combined to create a single component. As another example, the functionality performed by a single component may be performed by two or more components.

Figure 2:
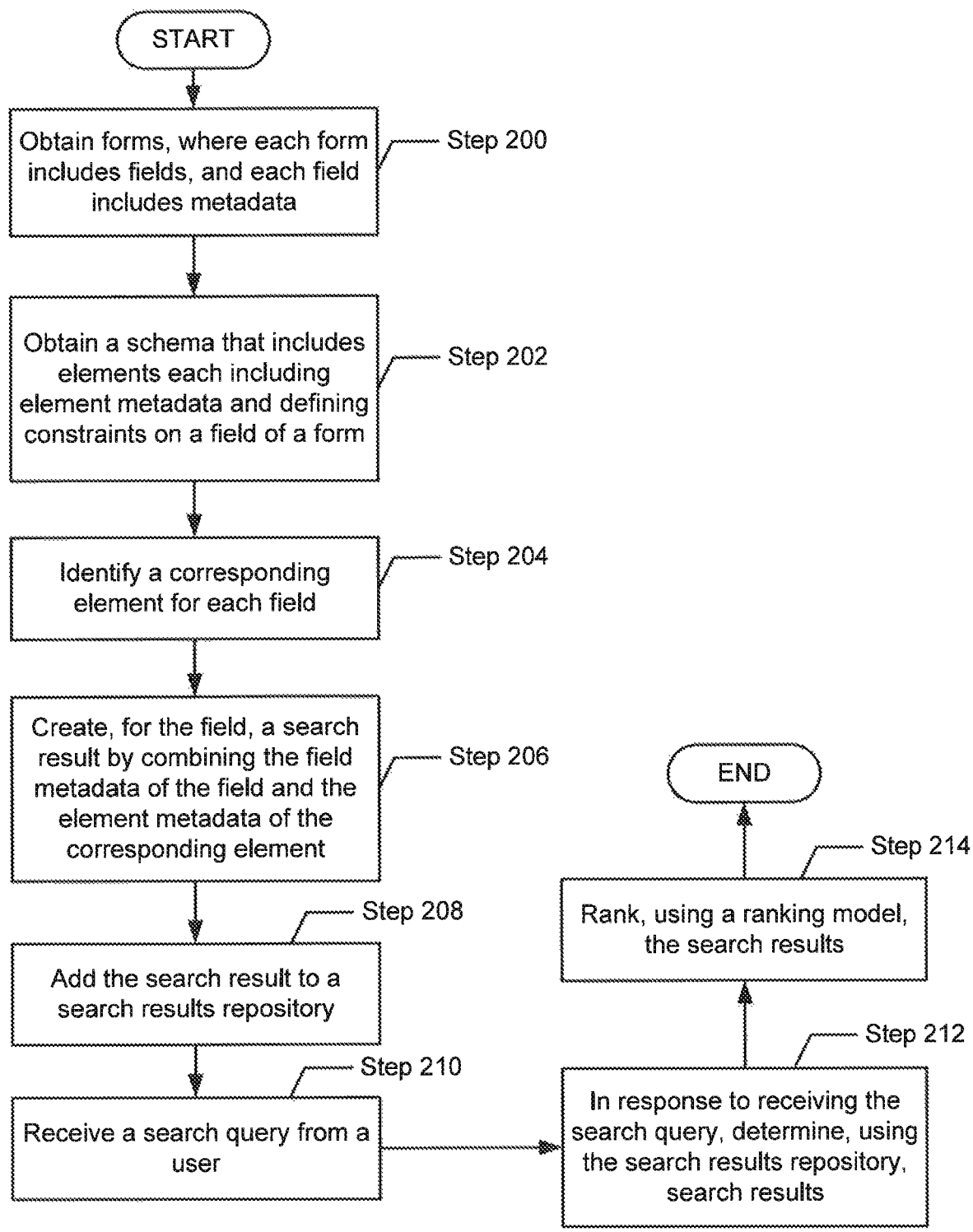
FIG. 2 and FIG. 3 show flowcharts in accordance with one or more embodiments of the invention.

FIG. 2 shows a flowchart in accordance with one or more embodiments of the invention. The flowchart depicts a process for generating search results. One or more of the steps in FIG. 2 may be performed by the components (e.g., the GUI (110), search results generator (114), or search results ranker (116) of the system (100)), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, forms are obtained. For example, the forms may correspond to a tax return that includes a set of tax forms. The forms may be obtained by the search results generator. Each form may include fields, and each field may include field metadata and a field value. In one or more embodiments, the field metadata includes a form identifier, a field identifier, an element identifier, and a field description. The form identifier may be a name or other identifier of the form that includes the field. The field identifier may be a name, number, or other identifier of the corresponding field. The element identifier may be a name, number, or other identifier of an element of the schema corresponding to the field, as described in Step 202 below. In one or more embodiments, including the element identifier in the field metadata establishes a linkage between a field of a form and the corresponding element of the schema, as described in Step 204 below. The field description may be any alphanumeric expression that describes the corresponding field (e.g., a set of keywords).

In Step 202, a schema is obtained. In one or more embodiments, the schema defines the structure of the forms obtained in Step 200 above. The schema may be obtained by the search results generator. The schema may include elements each describing constraints and/or other information relating to a field of a form. An element may include element metadata. In one or more embodiments, the element metadata includes an element identifier and an element description. The element description may be any alphanumeric expression that describes the corresponding element (e.g., a set of keywords).

In Step 204, the corresponding element for each field is identified. In one or more embodiments, the element identifier in the field metadata of the field is used to identify the corresponding element. As described above, the same element identifier may be present in both the field metadata of the field and the element metadata of the corresponding element. In other words, the field and its corresponding element may be linked by a common element identifier. In one or more embodiments, the search results generator identifies the corresponding element (e.g., via a string search in the schema) by finding the element whose element metadata includes the element identifier of the field metadata.

In Step 206, a search result for the field is created by combining the field metadata of the field and the element metadata of the element. The search result may be created by the search results generator. In one or more embodiments, the search result identifies a field of a form and provides a description of the field. The search result may include a form identifier, a field identifier, and a result description. In one or more embodiments, the result description is a combination of the field metadata and the element metadata. For example, the result description may be a combination of (e.g., a concatenation of): the field description of the field and the element description of the element corresponding to the field.

In one or more embodiments, the forms may correspond to form instructions that instruct a user regarding how to populate the corresponding form. A form instruction may include field instructions corresponding to the fields of a form. Each field instruction may include field instruction metadata. In one or more embodiments, the field instruction metadata includes a form identifier, a field identifier, and a field instruction description. In one or more embodiments, the result description of the search result may include field instruction metadata (e.g., a field instruction description) corresponding to the form identifier and the field identifier.

In Step 208, the search result is added to a search result repository. The search result may be added to the search result repository by the search results generator. In one or more embodiments, the search result repository includes a search result for each field of each form obtained in Step 200 above.

In Step 210, a search query is received from a user. The search query may be received by the graphical user interface (GUI). The search query may include one or more keywords and/or keyphrases that represent search criteria of the user. For example, the one or more keywords and/or keyphrases may represent search criteria regarding where to enter data into the forms obtained in Step 200 above.

In Step 212, search results are determined, using the search result repository, in response to receiving the search query. The search results may be determined by the search results generator.

In Step 214, the search results are ranked using a ranking model. The search results may be ranked by the search results ranker. In one or more embodiments, the ranking model may include weighting factors used to rank the relevance of various keywords included in the search results. In one or more embodiments, the ranking model includes rules that assign weighting factors to keywords. For example, a rule may assign a high weighting factor to a keyword (e.g., "mortgage") included in the search results based on the inclusion of one or more other keywords (e.g., "homeowner", "property") in the corresponding search query. In one or more embodiments, a weighting factor may be based on a user context.

In one or more embodiments, the user context includes a profile, forms, and/or search histories corresponding to the user. The profile may include: a location of the user, an income level of the user, etc. For example, a field specified in a search result may have greater relevance, and therefore a higher ranking, for a user whose income level exceeds a predetermined amount. As another example, a rule associated with the ranking model may assign a weighting factor to a keyword used in the search results based on the field value of a field of a form (e.g., a partially populated tax form) included in the user context. Similarly, the forms of the user context may include information that may be relevant to the ranking of the search results generated in response to the search query. For example, a field value of a field of a form populated by the user may indicate a location of the user, an income level of the user, etc.

In one or more embodiments, the selected results of search histories of the user may be used to rank the search results. As another example, a rule associated with the ranking model may assign a weighting factor to a keyword based on the presence of the keyword in the selected results of a search history included in the user context. In one or more embodiments, search histories whose search query is comparable to the current search query may be used to rank the search results. In one or more embodiments, a comparable search query may include keywords that are similar to the keywords of the current search query. For example, a comparable search query may include keywords that are within a threshold degree of similarity relative to the keywords of the current search query.

In one or more embodiments, the selected results of search histories of comparable users of the current user may be used to rank the search results. In one or more embodiments, comparable users have a profile similar to the current user. For example, two profiles may be similar when they include a similar location and/or income level (e.g., when the locations or income levels are within a threshold degree of similarity).

Figure 3:
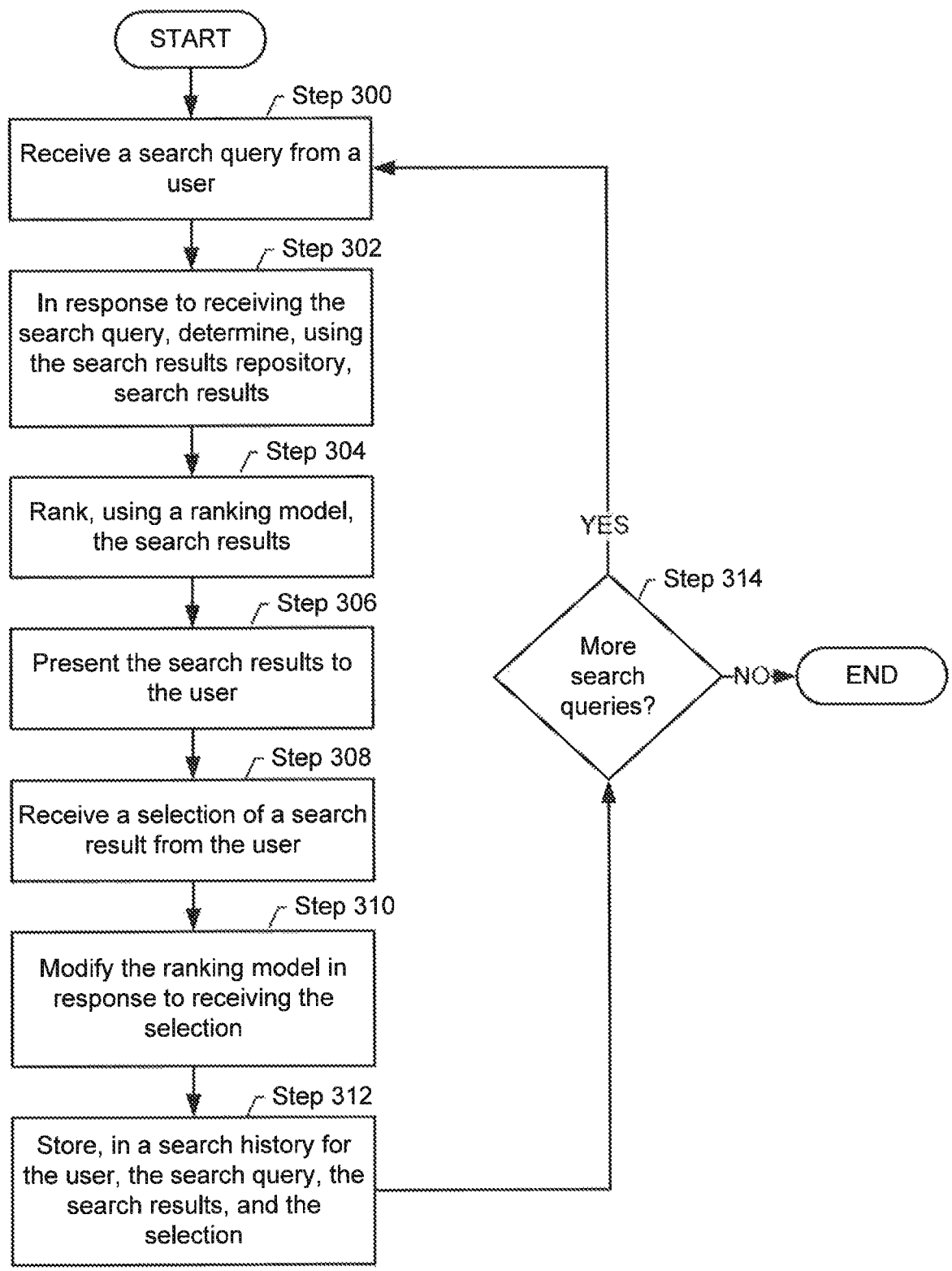

FIG. 3 shows a flowchart in accordance with one or more embodiments of the invention. The flowchart depicts a process for generating search results. One or more of the steps in FIG. 3 may be performed by the components (e.g., the GUI (110), search results generator (114), or search results ranker (116) of the system (100)), discussed above in reference to FIG. 1A. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 300, a search query is received from a user (see description of Step 210 above).

In Step 302, search results are determined for the search query using the search result repository (see description of Step 212 above).

In Step 304, the search results are ranked using a ranking model (see description of Step 214 above).

In Step 306, the search results are presented to the user. The search results may be presented to the user by the graphical user interface (GUI).

In Step 308, a selection of one of the search results is received from the user. The selection may be received by the GUI. In one or more embodiments, when the user selects the search result, the GUI displays the form corresponding to the search result. In one or more embodiments, the GUI displays (e.g., highlights) the field of the form corresponding to the search result. In one or more embodiments, the GUI tracks whether the user edits the field value corresponding to the field corresponding to the search result.

In Step 310, the ranking model is modified in response to receiving the selection. In one or more embodiments, the weight(s) corresponding to the keyword(s) in the selection are adjusted (e.g., increased). In one or more embodiments, the amount of the adjustment depends on whether the user edited the field value of the field corresponding to the selection. For example, the weight corresponding to a keyword in the selection may be increased by a larger amount when the user edits the field value of the field corresponding to the selection. In contrast, the weight corresponding to a keyword in the selection may be increased by a smaller amount when the user views the form corresponding to the selection but does not edit the field value of the field corresponding to the selection. In addition, the weight corresponding to a keyword in the selection may be decreased when the user does not view the form corresponding to the selection. In this manner, the selection may function as additional training data for the ranking model used by the search ranker to rank the search results determined in Step 302 above.

In Step 312, a search history for the user is stored including the search query, the search results, and the selection. The search history may be stored in a search history repository. For example, the search history may be used by the search ranker when ranking the search results generated in response to subsequent search queries.

If, in Step 314, it is determined that there are additional search queries to be processed, then Step 300 above is performed to receive the next search query, and the sequence of steps from Step 302 thru Step 312 is performed for the next search query, and so on.

The following example is for explanatory purposes only and not intended to limit the scope of the invention. FIG. 4A, FIG. 4B, FIG. 4C, FIG. 4D, and FIG. 4E show an implementation example in accordance with one or more embodiments of the invention.

Figure 4A:
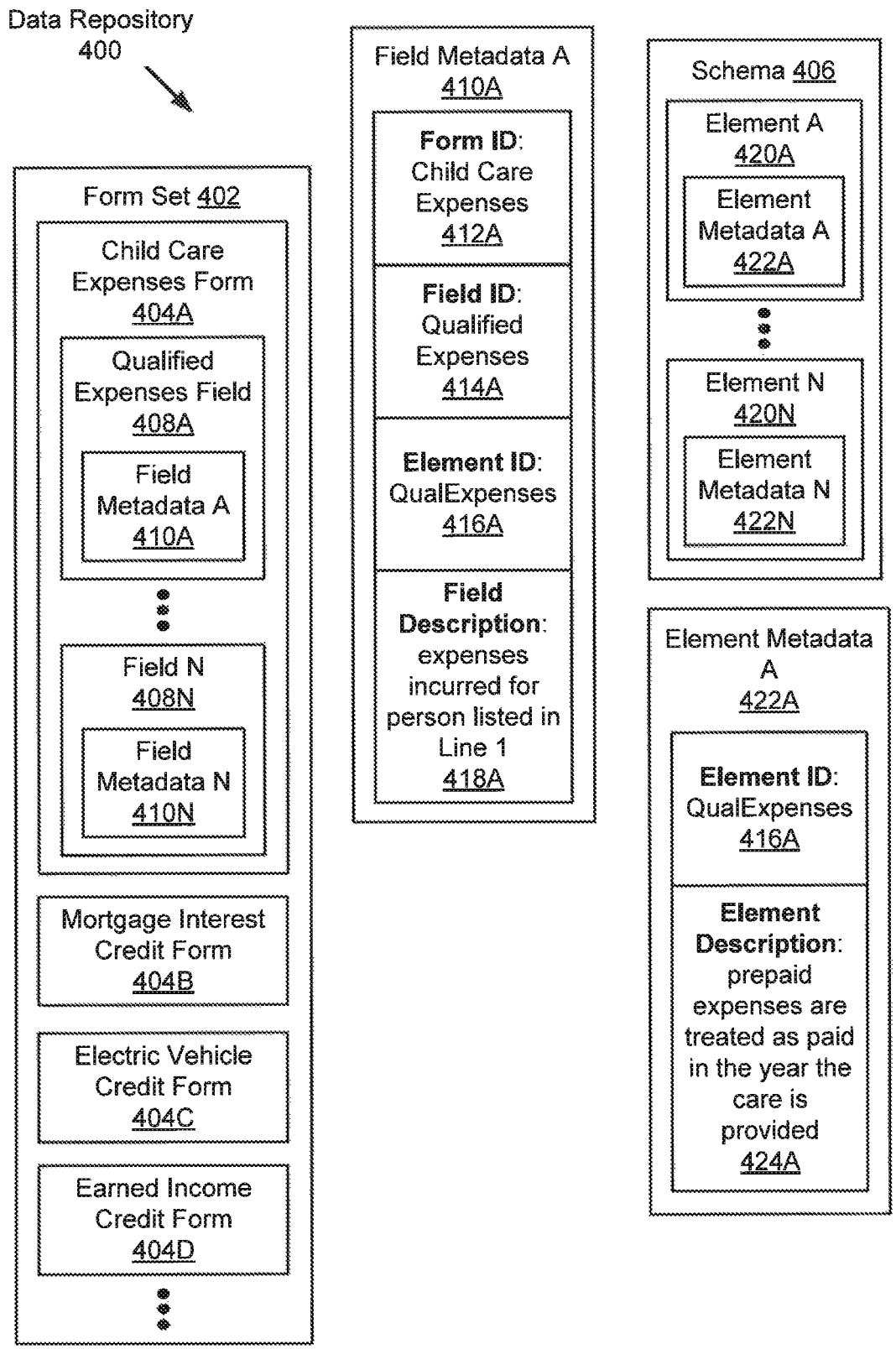

Initially, as shown in FIG. 4A, the search results generator (114) obtains a form set (402) ((118) in FIG. 1A) that includes tax forms (404A, 404B, 404C, 404D), as well as a corresponding schema (406) ((120) in FIG. 1A), from a data repository (400)((112) in FIG. 1A). FIG. 4A illustrates that the Child Care Expenses Form (404A) includes fields (408A, 408N), each of which includes field metadata (410A, 410N). For example, the Qualified Expenses field (408A) includes field metadata A (410A), which includes form identifier "Child Care Expenses" (412A), field identifier "Qualified Expenses" (414A), element identifier "QualExpenses" (416A), and a field description (418A).

The schema (406) includes elements (420A, 420N), each of which includes element metadata (422A, 422N). Element A (420A) includes element metadata A (422A), which includes element identifier "QualExpenses" (416A) and an element description (424A). Element A (420A) corresponds to the Qualified Expenses field (408A). For example, element A (420A) describes (e.g., in element metadata A (422A)) the Qualified Expenses field (408A).

As shown in FIG. 4B, the search results generator (114) next builds the search results repository (430) ((122) in FIG. 1A) by creating search results (432A, 432N) corresponding to each field of each form (404A, 404B, 404C, 404D). FIG. 4B illustrates the creation of search result A (432A), which corresponds to the Qualified Expenses field (408A) of the Child Care Expenses form (404A). First, the search results generator (114) identifies element A (420A) as the element of the schema (406) corresponding to the Qualified Expenses field (408A). Including element identifier "QualExpenses" (416A) in field metadata A (410A) of the Qualified Expenses field (408A) establishes the linkage between the Qualified Expenses field (408A) and element A (420A). The search results generator (114) identifies element A (420A) as the element matching the Qualified Expenses field (408A) using a string matching utility that locates the element identifier "QualExpenses" (416A) within the schema (406).

The search results generator (114) then creates search result A (432A) by combining field metadata A (410A) of the Qualified Expenses field (408A) with element metadata A (422A) of the schema (406), as illustrated in FIG. 4B. That is, search result A (432A) includes result description A (434A), which is a combination of field description A (418A) of field metadata A (410A) and element description A (424A) of element metadata A (422A). The search results generator (114) then adds search result A (432A) to the search results repository (430). Thus, all the keywords of result description A (434A) are available to the search results generator (114) when determining search results that satisfy search queries, as discussed below. In this manner, the search results generator (114) creates a search result (432A, 432N) corresponding to each field of each form (404A, 404B, 404C, 404D), and adds the search result (432A, 432N) to the search results repository (430).

Once the search results repository (430) has been created, the search results generator (114) uses the search results repository (430) to provide search results in response to search queries submitted by users. Each of the search results specifies a form identifier and a field identifier corresponding to a field in a form (404A, 404D). FIG. 4C illustrates search results (452) generated in response to a search query "where to enter credit in a tax return?" (450). The search results (452) include:

1) search result A (432A), including form identifier "Child Care Expenses" (412A), field identifier "Qualified Expenses" (414A), and a result description (434A), 2) search result B (432B), including form identifier "Mortgage Interest Credit" (412B), field identifier "Interest Paid" (414B), and a result description (434B), 3) search result C (432C), including form identifier "Earned Income Credit" (412C), field identifier "Earned Income" (414C), and a result description (434C), 4) search result D (432D), including form identifier "Electric Vehicle Credit" (412D), field identifier "Expense Deduction" (414D), and a result description (434D).

Figure 4D:
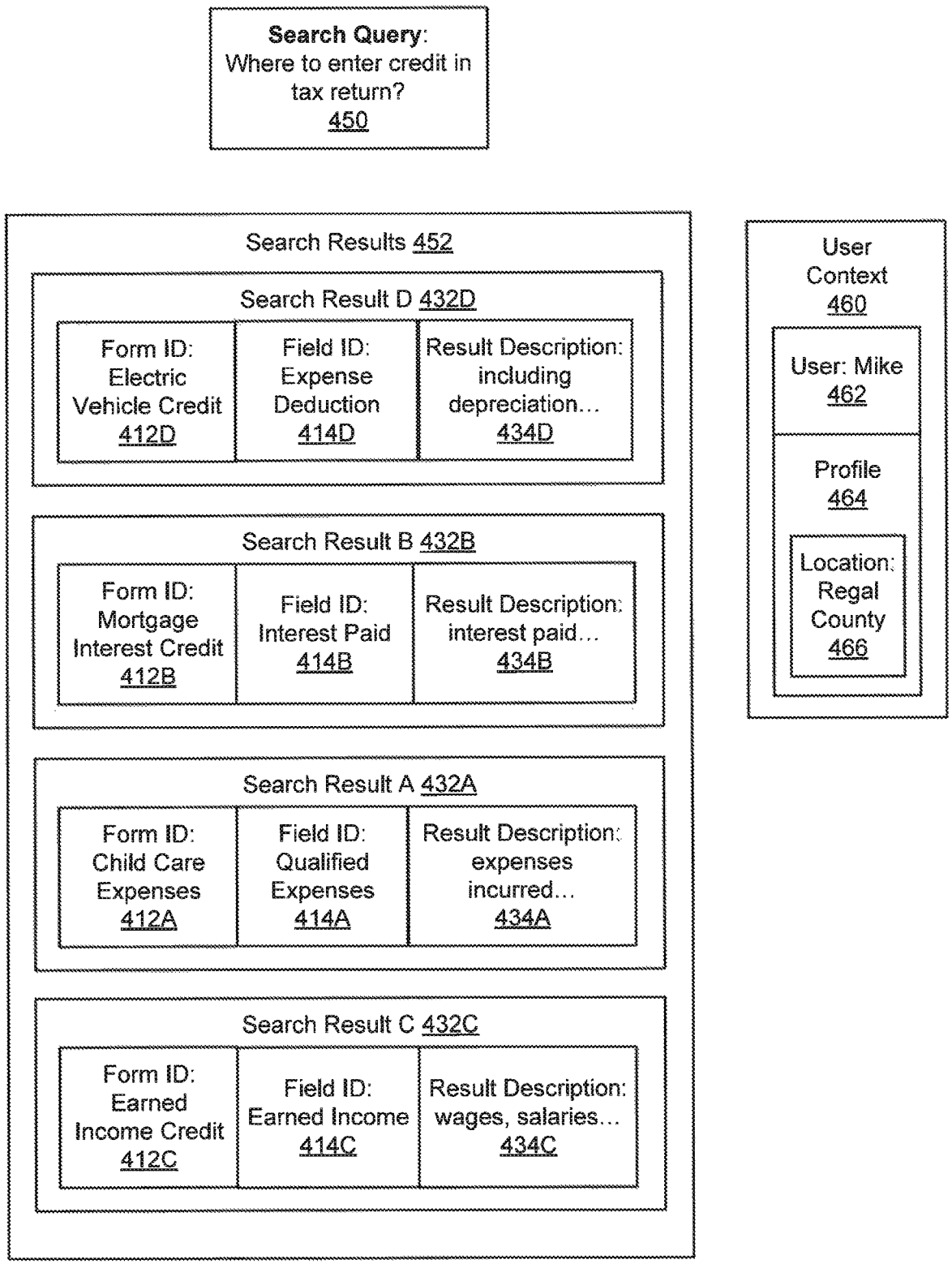

As illustrated in FIG. 4D, once the search results (452) have been generated, the search results ranker (116) ranks the search results (452) based on a user context (460) corresponding to the user (462) ((102) in FIG. 1A) who submitted the search query (450). The user context (460) includes a profile (464), which includes a location (466). Based on the location (466), the search results ranker (116) infers that the income level of the user (462) is high, and applies a rule that increases the weighting factors associated with certain keywords (e.g., "mortgage", "investment", "electric vehicle", etc.) when the income level of the user (462) is high. The resulting ranking of the search results (452) is shown in FIG. 4D.

In an alternate scenario, a rule may be triggered based on the field value of a field (e.g., whose corresponding field identifier includes the string "income") of a form (e.g., in a partially populated tax return) included in the user context (460).

Figure 4E:
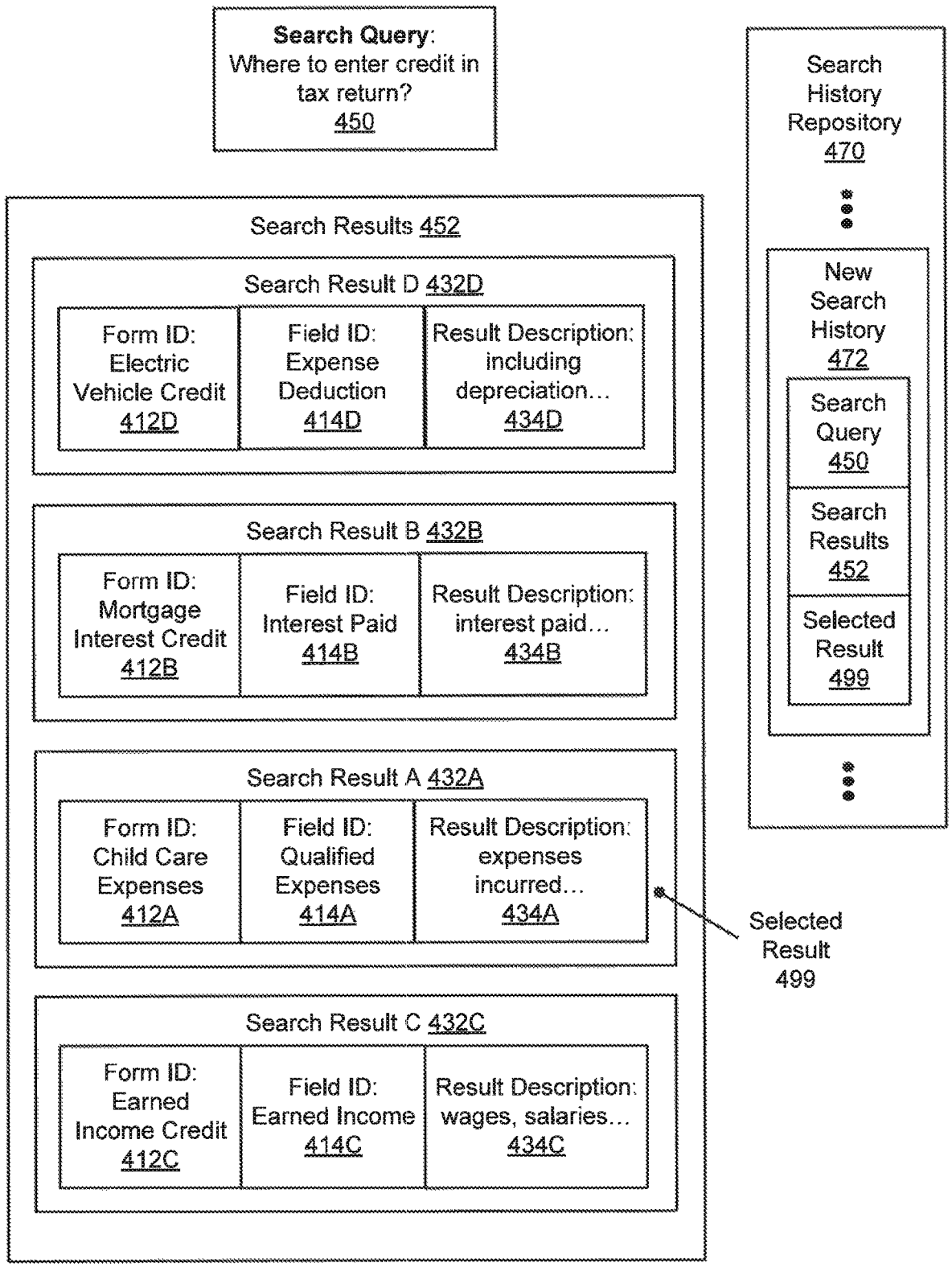

Once the search results (452) have been ranked, the graphical user interface (GUI) (110) presents the search results (452) to the user (462). Next, the GUI (110) receives a selected result (499) from the user (462), as illustrated in FIG. 4E. In this case, the selected result (499) corresponds to search result A (432A). The search results generator (114) then creates a new search history (472) that includes the search query (450), the search results (452), and the selected result (499), and adds the new search history (472) to the search history repository (470) ((126) in FIG. 1A).

The search results ranker (116) then updates its ranking model (128) by increasing the weights corresponding to the keywords included in the result description (434A) of the selected result (499). Thus, the selected search result (499) is used by the search results ranker (116) as feedback with which to update (e.g., retrain) the ranking model (128).

The search results ranker (116) uses the search history repository (470) when ranking search results corresponding to search queries submitted by the current user (462) and/or search queries submitted by other users (e.g., users whose profiles are comparable to the profile (464) of the current user (462)). That is, a selected result may be likely to be re-selected from other search results corresponding to search queries that are comparable to the current search query (450). Similarly, a selected result may be likely to be re-selected from other search results corresponding to search queries submitted by users who are comparable to the current user (462). For example, the weighting factor associated with a keyword may be increased based on the presence of the keyword in the selected results of a search history included in the user context (460) of the current user or a comparable user.

Figure 5A:
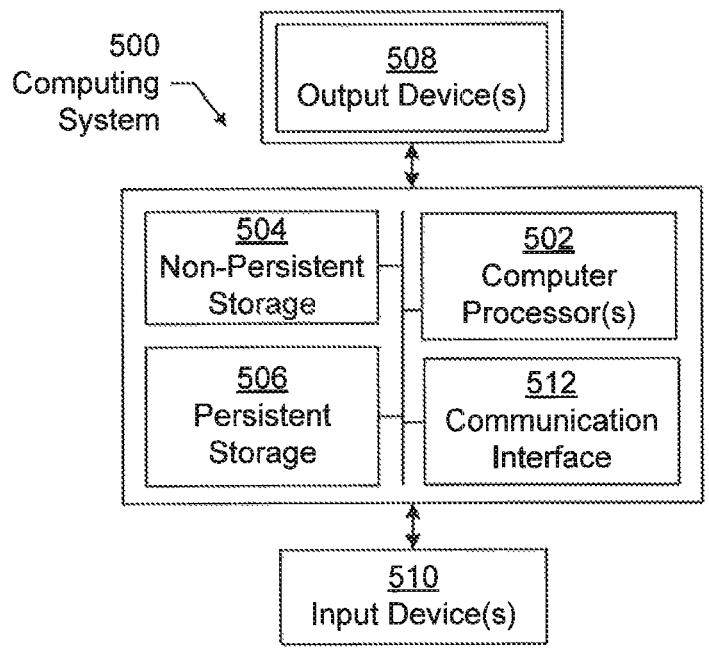
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
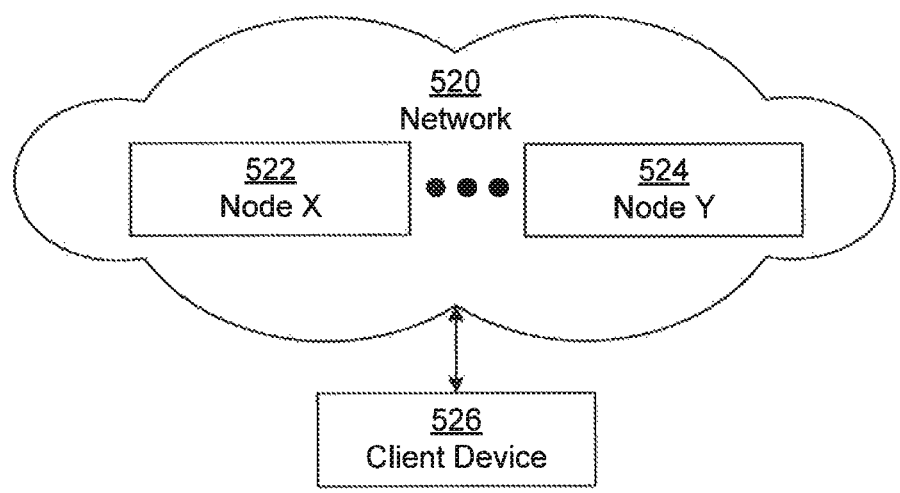

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
obtaining a form comprising a field, the field comprising a field value and field metadata, the form further comprising a corresponding form instruction, the form instruction comprising a field instruction corresponding to the field, wherein the field instruction includes field instruction metadata;
obtaining a schema that describes a structure of the form, the schema comprising an element that corresponds to the field and further comprising element metadata, wherein the element defines the structure of the form with respect to the field, wherein the element metadata describes the element, and wherein the schema is different than the field and the element metadata is different than the field metadata;
creating, for the field, a search result by combining the field metadata of the field, the element metadata of the element, and the field instruction metadata;
adding the search result to a search results repository;
receiving, from an initial user after adding the search result to the search results repository, an initial search query;
in response to receiving the initial search query, determining, using the search results repository, a plurality of query search results, wherein the plurality of query search results comprises the search result created by combining the field metadata, the element metadata, and the field instruction metadata; and
ranking, using a ranking model, the plurality of query search results.

2. The method of claim 1, further comprising:
presenting, to the initial user, the plurality of query search results;
receiving, from the initial user, a selection of one of the plurality of query search results; and
modifying the ranking model in response to receiving the selection.

3. The method of claim 1, further comprising:
obtaining, for a plurality of users, a plurality of search histories corresponding to a plurality of search queries comparable to the initial search query; and
modifying the ranking model based on the plurality of search histories.

4. The method of claim 1, wherein creating the search result comprises concatenating the field metadata and the element metadata.

5. The method of claim 1,
wherein the field metadata comprises a form identifier that identifies the form, a field identifier that identifies the field, an element identifier that identifies the element, and a field description that describes the field using alphanumeric characters,
wherein the element metadata comprises the element identifier and an element description that describes the element using alphanumeric characters, and
wherein combining the field metadata with the element metadata comprises combining the field description with the element description.

6. The method of claim 1, wherein the ranking model is based on a context of the initial user.

7. The method of claim 1, wherein:
the field describes data of the form;
the field value is changeable by a user;
the field metadata describes the field using alphanumeric characters;
the element further defines a constraint on the field; and
the element metadata is expressed as alphanumeric characters.

8. The method of claim 1, further comprising:
receiving, from the initial user, the field value,
wherein the ranking model further is based on the field value.

9. A system, comprising:
a computer processor;
a form comprising a field, the field comprising a field value and field metadata, the form further comprising a corresponding form instruction, the form instruction comprising a field instruction corresponding to the field, wherein the field instruction includes field instruction metadata;
a schema that describes a structure of the form, the schema comprising an element that corresponds to the field and further comprising element metadata, wherein the element defines the structure of the form with respect to the field, wherein the element metadata describes the element, and wherein the schema is different than the field and the element metadata is different than the field metadata;
a search results repository comprising a plurality of prior-generated search results;
a graphical user interface (GUI) executing on the computer processor configured to:
receive, from an initial user, an initial search query;
a search results generator executing on the computer processor configured to:
create, for the field, a search result by combining the field metadata of the field, the element metadata of the element, and the field instruction metadata;
add, thereafter, the search result to the search results repository; and
in response to receiving the initial search query, determine, using the search results repository, a plurality of query search results, wherein the plurality of query search results comprises the search result created by combining the field metadata, the element metadata, and the field instruction metadata;
a search results ranker comprising a ranking model and executing on the computer processor, wherein the search results ranker is configured to:
rank, using the ranking model, the plurality of query search results; and
a data repository comprising the form, the schema, and the search results repository.

10. The system of claim 9, wherein the data repository further comprises a search history repository,
wherein the GUI is further configured to:
present, to the initial user, the plurality of query search results; and
receive, from the initial user, a selection of one of the plurality of query search results,
wherein the search results ranker is further configured to:
modify the ranking model based on the selection.

11. The system of claim 10, wherein the search results ranker is further configured to:
obtain, from the search history repository and for a plurality of users, a plurality of search histories corresponding to a plurality of search queries comparable to the initial search query; and
modify the ranking model based on the plurality of search histories.

12. The system of claim 9,
wherein the field metadata comprises a form identifier that identifies the form, a field identifier that identifies the field, an element identifier that identifies the element, and a field description that describes the field using alphanumeric characters, wherein the element metadata comprises the element identifier and an element description that describes the element using alphanumeric characters, and wherein combining the field metadata with the element metadata comprises combining the field description with the element description.

13. The system of claim 9, wherein:

the field describes data of the form;

the field value is changeable by a user;

the field metadata describes the field using alphanumeric characters;

the element further defines a constraint on the field; and the element metadata is expressed as alphanumeric characters.

14. The system of claim 9, wherein the GUI is further configured to:
receive, from the initial user, the field value,
wherein the ranking model further is based on the field value.

15. A method, comprising:

obtaining a form comprising a field, the field comprising a field value and field metadata, obtaining a schema that describes a structure of the form, the schema comprising an element that corresponds to the field and further comprising element metadata, wherein the element defines the structure of the form with respect to the field, wherein the element metadata describes the element, and wherein the schema is different than the field and the element metadata is different than the field metadata;

creating, for the field, a search result by combining the field metadata of the field and the element metadata of the element, wherein the search result includes a form identifier that identifies the form, a field identifier that identifies the field, and a result description that is a combination of a field description of the field metadata of the field and an element description of the element metadata of the element;

adding the search result to a search results repository;

receiving, from an initial user after adding the search result to the search results repository, an initial search query;

in response to receiving the initial search query, determining, using the search results repository, a plurality of query search results, wherein the plurality of query search results comprises the search result created by combining the field description of the field metadata and the element description of the element metadata; and ranking, using a ranking model, the plurality of query search results.

16. The method of claim 15, further comprising:

presenting, to the initial user, the plurality of query search results;

receiving, from the initial user, a selection of one of the plurality of query search results; and modifying the ranking model in response to receiving the selection.

17. The method of claim 15, further comprising:

obtaining, for a plurality of users, a plurality of search histories corresponding to a plurality of search queries comparable to the initial search query; and modifying the ranking model based on the plurality of search histories.

18. The method of claim 15, wherein the field metadata comprises a form identifier that identifies the form, a field identifier that identifies the field, an element identifier that identifies the element, and a field description that describes the field using alphanumeric characters, wherein the element metadata comprises the element identifier and an element description that describes the element using alphanumeric characters, and wherein combining the field metadata with the element metadata comprises combining the field description with the element description.

19. The method of claim 15, wherein:

the field describes data of the form;

the field value is changeable by a user;

the field metadata describes the field using alphanumeric characters;

the element further defines a constraint on the field; and the element metadata is expressed as alphanumeric characters.

20. The method of claim 15, further comprising:

receiving, from the initial user, the field value, wherein the ranking model further is based on the field value.

* * * * *